United States Patent [19]

Young

[11] Patent Number: 5,614,476
[45] Date of Patent: Mar. 25, 1997

[54] METHOD FOR REDUCING THE CRYSTALLIZATION TEMPERATURE OF A CARBON DISULFIDE PRECURSOR-CONTAINING SOLUTION AND RESULTING COMPOSITIONS

[75] Inventor: Donald C. Young, Fullerton, Calif.

[73] Assignee: Entek Corporation, Brea, Calif.

[21] Appl. No.: 360,379

[22] Filed: Dec. 21, 1994

[51] Int. Cl.$^6$ .............................. E21B 37/06; E21B 43/22
[52] U.S. Cl. ......................... 507/239; 507/240; 507/244; 507/256; 166/304
[58] Field of Search ........................ 166/304; 507/239, 507/240, 244, 256

[56] References Cited

U.S. PATENT DOCUMENTS

| | | | |
|---|---|---|---|
| 1,844,883 | 2/1932 | De Groote . | |
| 2,873,253 | 2/1959 | Stanphill | 252/8.55 |
| 3,077,929 | 2/1963 | Fetkovich et al. | 166/41 |
| 3,241,614 | 3/1966 | Bertness | 166/41 |
| 3,724,552 | 4/1973 | Snavely, Jr. | 166/304 |
| 4,476,113 | 10/1984 | Young | 424/161 |
| 4,476,930 | 10/1984 | Watanabe | 166/279 |
| 4,551,167 | 11/1985 | Young et al. | 71/64.1 |
| 4,726,144 | 2/1988 | Young et al. | 47/58 |
| 4,818,410 | 4/1989 | Bellos et al. | 210/639 |
| 4,864,075 | 9/1989 | Thompson et al. | 558/237 |
| 4,908,142 | 3/1990 | Dumdum et al. | 252/17 |
| 4,908,143 | 3/1990 | Dumdum et al. | 252/17 |
| 4,956,099 | 9/1990 | Thompson et al. | 210/764 |
| 5,013,350 | 5/1991 | Green et al. | 71/65 |
| 5,022,912 | 6/1991 | Young et al. | 71/30 |
| 5,039,327 | 8/1991 | Pilling et al. | 71/27 |
| 5,041,240 | 8/1991 | Green et al. | 252/380 |
| 5,076,358 | 12/1991 | Kissel | 166/275 |
| 5,089,227 | 2/1992 | Thompson et al. | 422/16 |
| 5,089,619 | 2/1992 | Thompson et al. | 544/357 |
| 5,112,505 | 5/1992 | Jacobs et al. | 252/8.552 |
| 5,112,623 | 5/1992 | Green et al. | 424/713 |
| 5,130,473 | 7/1992 | Jacobs et al. | 562/27 |
| 5,165,920 | 11/1992 | Green et al. | 424/78.37 |
| 5,167,966 | 12/1992 | Green et al. | 424/715 |
| 5,190,677 | 3/1993 | Pilling et al. | 252/17 |
| 5,340,593 | 8/1994 | Green, II et al. | 424/715 |

FOREIGN PATENT DOCUMENTS

| | | |
|---|---|---|
| 235889 | 1/1969 | U.S.S.R. . |
| 348594 | 8/1972 | U.S.S.R. . |

OTHER PUBLICATIONS

Unocal Product Information, IMD-710 Dewaxer, (Jun. 1993).
Kissel et al., "Water-Based Tetrathiocarbonates as Specialty Chemicals for Petroleum Production," 13th Annual Pacific Coast Oil Show & Conference, (Nov. 8–10, 1994).
Roncero et al., Felle u. Seifen 54, 550–5 (1952); cf. C.A. 45, 9281g.
Kazimierz Szadkowski, Wiad. Naft. 1966, 129–31 (1966) (Pol).
Karanth, P.I., Petrol. Hydrocarbons (1970), 5(2), 32–6 (Eng.)., Pub. in Chem. Age India 21(7).
Ruadakova, N. Ya, Khim, Tekhnol, Topl. Masel (1972), 17(1), 15–19 (Russ.).
Rudakova et al., Neft. Gazov. Prom (1974), (2), 32–4 (Russ).
Chemical Abstracts 88:25290z (1978).
Chemical Abstracts 88:63944y (1978).
Chemical Abstracts 88:107785d (1978).
Chemical Abstracts 90:189466d (1979).
Chemical Abstracts 90:189467e (1979).
Chemical Abstracts 90:189468f (1979).
Chemical Abstracts 90:171121c (1979).
Chemical Abstracts 90:171136m (1979).
Chemical Abstracts 90:171137n (1979).
Chemcial Abstracts 91:142930f (1979).
Chemical Abstracts 92:166295z (1980).
Chemical Abstracts 94:14975z (1981).
Chemical Abstracts 95:9554c (1981).
Chemical Abstracts 95:83347d (1981).
Chemical Abstracts 95:222699k (1981).
Chemcial Abstracts 97:219235a (1982).
Chemical Abstracts 97:219237u (1982).
Chemical Abstracts 98:125373d (1983).
Chemical Abstracts 98:200964c (1983).
Chemical Abstracts 99:178578b (1983).
Chemical Abstracts 100:9640z (1984).
Chemical Abstracts 102:169536q (1985).

*Primary Examiner*—Richard L. Raymond
*Attorney, Agent, or Firm*—Gregory F. Wirzbicki; Shlomo R. Frieman

[57] ABSTRACT

Compounds selected from the group consisting of ammonia, ammonium-containing compounds, urea, urea homologues and analogues, and mixtures thereof surprisingly lower the crystallization temperature of aqueous, carbon disulfide precursor (e.g., thiocarbonate)-containing solutions.

35 Claims, No Drawings

METHOD FOR REDUCING THE CRYSTALLIZATION TEMPERATURE OF A CARBON DISULFIDE PRECURSOR-CONTAINING SOLUTION AND RESULTING COMPOSITIONS

BACKGROUND

The present invention relates to the use of aqueous, carbon disulfide precursor-containing solutions in the production of oil from subterranean formations.

Aqueous, carbon disulfide-containing solutions have been used as dewaxing agents and sulfur deposition inhibitors in the production of oil from subterranean formations. See, for example, U.S. Pat. No. 3,724,552 and U.S. Pat. No. 5,076,358, these documents being incorporated herein in their entireties by reference.

SUMMARY OF THE INVENTION

Due to their high crystallization temperature, aqueous, carbon disulfide precursor-containing solutions cannot readily, if at all, be employed during cold weather to enhance the production of oil from subterranean formations. (As used in the specification and claims, the term "crystallization temperature" means the temperature at which crystals begin to form in an aqueous solution as the temperature of the aqueous solution is lowered.) For example, a 54 weight percent solution of a stabilized sodium tetrathiocarbonate has a crystallization temperature of about 0° C. (−32° F.) and a 32 weight percent solution of a stabilized sodium tetrathiocarbonate solution has a crystallization temperature of about −18.3° C. (−1° F.). (As used in the specification and claims, the term "weight percent" (in the context of the concentration of a constituent in a solution) means the weight of the constituent divided by the total weight of all solvents and solubilized solutes present in the solution, the quotient being multiplied by 100%. The foregoing increase in the crystallization temperature with increasing sodium tetrathiocarbonate concentration is the normal phenomena exhibited by an aqueous solution in the solute concentration range where the solute (as opposed to the solvent) crystallizes out as the solution temperature is lowered.) Hence, a 32 weight percent solution of stabilized sodium thiocarbonate is not suitable for use at ambient temperatures below about −18.3° C. (−1° F.).

Accordingly, there is a need for an aqueous, carbon disulfide precursor-containing solution capable of being readily employed at low temperatures to enhance oil production from a subterranean formation. The present invention satisfies this need by providing aqueous, carbon disulfide precursor-containing solutions having lower crystallization temperatures. In particular, the carbon disulfide precursor-containing solutions used in the present invention further comprise a crystallization temperature depressing concentration of at least one "amur." (As used in the specification and claims, the term "amur" means a compound selected from the group consisting of ammonia, ammonium-containing compounds, urea, and urea homologues and analogues.) As shown in the examples below, in a concentration range where the solute crystallizes out as the solution temperature is lowered, the carbon disulfide precursor- and amur-containing solutions of the present invention surprisingly have a lower crystallization temperature than an aqueous solution having a lower solute concentration, namely an aqueous solution comprising the same carbon disulfide precursor concentration but devoid of any amur. For example, a stabilized thiocarbonate solution comprising about 31.8 weight percent sodium tetrathiocarbonate and about 7.7 weight percent ammonia has a crystallization temperature of about −48° C., whereas a stabilized thiocarbonate solution comprising about 31.8 weight percent sodium tetrathiocarbonate and devoid of ammonia is about −22° C. Accordingly, the fact that the aqueous solutions of the present invention exhibit a lower crystallization temperature than corresponding aqueous solutions containing the same carbon disulfide concentration, but devoid of any amur (i.e., having a lower solute concentration), is unexpected because, as noted above, the general phenomena exhibited by an aqueous solution in the solute concentration range where the solute crystallizes out is for the crystallization temperature to increase with increasing solute concentration.

The invention also encompasses a method for enhancing the production of oil from a subterranean formation, an oil production system, and an oil handling system. The enhanced oil production method comprises the step of injecting an aqueous, carbon disulfide precursor- and amur-containing solution into a well penetrating a subterranean formation. The oil production system comprises (a) an oil-bearing subterranean formation, (b) a well penetrating at least a portion of the oil-bearing subterranean formation; and (c) the aqueous, carbon disulfide precursor- and amur-containing solution present in at least a portion of the well. The oil handling system comprises (a) a device for transporting, holding, or processing oil (e.g., flowlines, storage or holding tanks, wemcos, free-water-knock-outs, heater treaters, gun barrels, API separators, pumps, filters, pipelines, etc.), (b) oil present in the device, and (c) the aqueous, carbon disulfide precursor- and amur-containing solution present in the device.

DETAILED DESCRIPTION OF THE INVENTION

The amur employed in the aqueous solutions of the present invention is preferably selected from the group consisting of ammonia, ammonium nitrate, ammonium chloride, ammonium sulfate, ammonium acetate, ammonium phosphate, urea, biuret, methyl urea, ethylene urea, ethylene oxide urea, triuret, formamide, dimethylformamide, acetamide, propionamide, butyramide, valeramide, caproamide, benzamide, acetanilide, and mixtures thereof. Ammonia and ammonium-containing compounds are the more preferred amurs, with ammonia being the most preferred.

Carbon disulfide precursors used in the solutions of the present invention include, but are not limited to, thiocarbonates, dithiocarbamates (e.g., disodium ethylenebisdithiocarbamate, disodium hexadecamethylenebisdithiocarbamate), and xanthates (e.g., sodium ethyl xanthate). Methods for preparing dithiocarbamates and xanthates are disclosed in U.S. Pat. No. 3,724,552.

Regarding thiocarbonates, the thiocarbonates used in the process of the present invention generally have the formula I

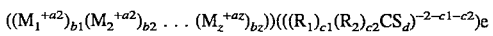

$$((M_1^{+a2})_{b1}(M_2^{+a2})_{b2} \ldots (M_z^{+az})_{bz})(((R_1)_{c1}(R_2)_{c2}CS_d)^{-2-c1-c2})e$$

where $M_1$, $M_2$, and $M_z$ are each independently selected from the group consisting of inorganic and organic cations; a1 is the valence of $M_1$; $a_2$ is the valence of $M_2$; az is the valence of $M_z$; each of b1, b2, and bz is 0 or a positive integer (i.e., 1 or a whole number greater than 1), provided that b1+b2+ . . . +bz equals a positive integer; $R_1$ and $R_2$ are each independently selected from the group consisting of monovalent organic groups; each of c1 and c2 is 0 or 1; d is at least 3; e is a positive integer, provided that (a1·b1+ a2·b2+ . . . +az·bz) equals (2−c1−c2)° e. (As used in the specification and claims, the term "inorganic cation" means a cation devoid of even one carbon atom; the term "organic cation" means a cation containing at least one carbon atom; and the term "organic group" means a group containing at least one carbon atom.) More typically, the thiocarbonates employed in the present invention have the formula II

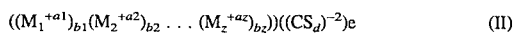

where $M_1$, $M_2$, $M_z$, a1, a2, az, b1, b2, bz, d, and e are as defined above. Most often, the process of the present invention employs thiocarbonates having the formula III

where M is selected from the group consisting of inorganic and organic cations; a is the valence of M; b is a positive integer; d is as defined above; and a·b equals 2. (The discussion in the remaining portion of the specification regarding M is equally applicable to $M_1$, $M_2$, and $M_z$.)

Preferred inorganic cations for M are ammonium ion, alkali metal cations (especially sodium and potassium), alkaline earth metal cations (especially magnesium and calcium), and transition metal cations (especially zinc, iron, manganese, copper, and molybdenum).

Organic cations include, but are not limited to, compounds having the formula IV

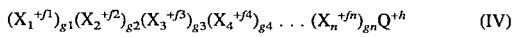

where $X_1$, $X_2$, $X_3$, $X_4$, and $X_n$ are independently selected from the group consisting of hydrogen and $C_1$-$C_{50}$ organic groups; f1 is the valence of $X_1$; f2 is the valence of $X_2$; f3 is the valence of $X_3$; f4 is the valence of $X_4$; fn is the valence of $X_n$; Q is a nonmetal; each of g1, g2, g3, g4, and gn is 0 or 1; and h is the valence of Q, provided that at least one of X1, X2, $X_3$, $X_4$, or $X_n$ is an organic group, the total number of carbon atoms in the organic cation is 1 to 60, and f1+f2+f3+f4+ . . . +fn is a positive integer less than h (generally equal to h−1 or h−2).

The most suitable organic cations have the formula V

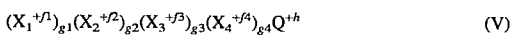

where $X_1$, $X_2$, $X_3$, $X_4$, Q, and h are as defined above; and each of f1, f2, f3, f4, g1, g2, g3, and g4 is 1.

The organic groups employed for $R_1$, $R_2$, $X_1$, $X_2$, $X_3$, $X_4$, and $X_n$ can be derived from aliphatic, alicyclic, or aromatic compounds, and include straight chain, branched chain, and cyclic structures. The organic groups can be, for example, substituted or unsubstituted alkyl, alkenyl, alkynyl, aryl, arylalkyl, or alkylaryl groups, and can include heteroatoms such as oxygen, sulfur, nitrogen, and phosphorus. Generally, each $R_1$, $R_2$, $X_1$, $X_2$, $X_3$, $X_4$, and $X_n$ comprises up to about 20, preferably up to 12, more preferably up to 8, even more preferably up to 6, and most preferably up to 4, carbon atoms. Each of $R_1$, $R_2$, $X_1$, $X_2$, $X_3$, $X_4$, and $X_n$ is also preferably a hydrocarbyl group (e.g., methyl, ethyl, n-propyl, isopropyl, n-butyl, sec-butyl, t-butyl, isobutyl, hexyl, octyl, phenyl, and benzyl), with the most preferred hydrocarbyl groups being alkyl groups.

The total number of carbon atoms in the organic cation is usually 1 to 40, preferably 1 to 20, more preferably 1 to 10, and most preferably 1 to 8.

Q is preferably nitrogen, phosphorus, arsenic, or antimony, with the corresponding organic cations being primary, secondary, tertiary, and quaternary ammonium, phosphonium, arsonium, and stibonium cations. More preferably, the organic cation is a quaternary ammonium cation.

While the thiocarbonate is preferably a tetrathiocarbonate (d=4), the thiocarbonate can also be a pentathiocarbonate (d=5), a hexathiocarbonate (d=6), and a septathiocarbonate (d=7). In fact, d can be 8 or more.

Thiocarbonates present in the aqueous solution are preferably stabilized with a stabilizing agent selected from the group consisting of bases, sulfur, sulfur-containing compounds, and mixtures thereof. The most preferred stabilized, thiocarbonate solutions used in the present invention contain one or more bases in addition to sulfur and/or one or more sulfur-containing compounds.

The sulfur-containing compounds have a formula selected from the group consisting of H2Si, HR1Si, $R_1R_2S_i$, $MHS_i$, $(M^{+a})_b S_i$, and $MR_1S_i$, where M, $R_1$, $R_2$, a, and b are as defined above (provided that a·b equals 2) and i is at least 1. When the sulfide-containing compound is a monosulfide, i is 1, and when the sulfide-containing compound is a polysulfide i is greater than 1. Generally, i is from about 1 to about 5, and preferably 2 to about 5. The sulfur-containing compounds are preferably soluble in the aqueous, thiocarbonate solution, and are more preferably significantly soluble in water. Most preferably, the sulfur-containing compounds are selected from the group consisting of ammonium sulfide, ammonium polysulfides, alkali sulfides, alkali polysulfides, alkaline earth metal sulfides, alkaline earth metal polysulfides, and mixtures thereof.

Virtually any organic or inorganic base can be used as a stabilizing agent. Exemplary organic and inorganic bases are listed in the Handbook of Chemistry and Physics, 65th Edition, Weast et al. Editors, CRC Press, Inc., Boca Raton, Fla. (1984), pages D-163 to D-165 (hereinafter referred to as the "Handbook"), which Handbook is incorporated herein in its entirety by reference. Preferably, the base employed in the present invention is selected from the group consisting of alkali metal hydroxides (especially, sodium hydroxide and potassium hydroxide), alkaline earth metal hydroxides, and ammonium hydroxide.

The stabilizing agent is generally present in the thiocarbonate solution in a sufficient concentration to reduce the vapor pressure of carbon disulfide in the equilibrium vapor phase overlying the solution. The amount of stabilizing agent required to achieve a desired carbon disulfide vapor pressure reduction is easily determined by adding different, known quantities of the stabilizing agent to the thiocarbonate solution, confining the vapor space over the solution at about 24° C. (75.2° F.) for a sufficient period of time, e.g., about 24 hours, and analyzing the vapor phase by gas chromatography for carbon disulfide. Lower additive concentrations will result in somewhat higher $CS_2$ equilibrium concentrations (i.e., higher $CS_2$ partial pressures), and higher additive concentrations will result in lower $CS_2$ partial pressures.

In terms of carbon disulfide partial pressure, the solutions generally have a carbon disulfide partial pressure of about 2 or less, preferably about 1.5 or less, more preferably about 1 or less, even more preferably about 0.5 or less, and most preferably about 0.2 or less, volume percent in the equilibrium vapor phase overlying the solution at about 24° C. (75.2° F.).

Further details regarding stabilized thiocarbonate solutions are contained in U.S. Pat. Nos. 5,041,240, 5,112,623, 5,165,920, 5,167,966, and 5,173,306, these documents being incorporated herein in their entireties by reference.

Methods for synthesizing thiocarbonates are well known to those skilled in the art. See, for example, U.S. Pat. Nos. 4,476,113, 4,551,167, 4,726,144, 5,013,350, 5,022,912, and 5,112,623, these documents being incorporated herein in their entireties by reference, as well as U.S. Pat. Nos. 5,041,240, 5,165,920, 5,167,966, and 5,173,306. Preferably, the thiocarbonate is synthesized in accordance with the procedure described in U.S. patent application Ser. No. 08/321,097, which application is incorporated herein in its entirety by reference.

The thiocarbonate concentration in the thiocarbonate- and amur-containing aqueous solutions of the present invention is commonly at least about 10, preferably at least about 15, more preferably at least about 20, even more preferably at least about 25, and most preferably at least about 30, weight percent. Typically, the thiocarbonate- and amur-containing aqueous solutions have a thiocarbonate concentration less than about 55, more typically less than about 50, even more typically less than about 45, and most typically less than about 40 weight percent.

The carbon disulfide precursor concentration in the aqueous solution is significantly greater than the amur concentration. More specifically, the ratio of the weight percent of the carbon disulfide precursor to the weight percent of amur present in the aqueous solution is generally 2:1 or more, preferably about 2.5:1 or more, more preferably about 3:1 or more, even more preferably about 3.5:1 or more, and most preferably about 4:1 or more. Provided that the foregoing ratio is maintained, the amur is typically employed in the aqueous, carbon disulfide precursor-containing solutions in a concentration of at least about 0.1, preferably at least about 0.25, more preferably at least about 0.5, even more preferably at least about 0.75, and most preferably at least about 1, weight percent. Commonly, the amur is present in the solution in a concentration of about 15 or less, more commonly about 14 or less, even more commonly about 13 or less, and most commonly about 12 or less. When an amur having a crystallization temperature reducing efficacy comparable to ammonia is employed, the amur concentration in the carbon disulfide precursor-containing solution is desirably about 2 to about 12, preferably about 3 to about 11, more preferably about 4 to about 10, even more preferably about 5 to about 9, and most preferably about 6 to about 8, weight percent.

As noted above, the amur depresses the crystallization temperature of the aqueous, carbon disulfide precursor-containing solution below that of a comparative solution having the same carbon disulfide precursor concentration and compositionally differing from the aqueous, carbon disulfide precursor-containing solution solely in that the comparative solution is devoid of the amur. To illustrate, an aqueous thiocarbonate solution comprising about 30 weight percent sodium thiocarbonate, about 5 weight percent ammonia, and about 65 weight percent water has a lower crystallization temperature than a comparative solution comprising about 30 weight percent sodium thiocarbonate and about 70 weight percent water.

Accordingly, in terms of crystallization temperature depression, the aqueous, carbon disulfide precursor- and amur-containing solutions of the present invention generally have a crystallization temperature at least about 2.7° C. (5° F.), preferably at least about 5.6° C. (10° F.), more preferably at least about 8.3° C. (15° F.), even more preferably at least about 11.1° C. (20° F.), and most preferably at least about 13.9° C. (25° F.) less than the crystallization temperature of the corresponding comparative solution having the same carbon disulfide precursor concentration and compositionally differing from the respective carbon disulfide precursor-containing solution solely in that the comparative solution is devoid of the amur. In fact, when the amur has a crystallization temperature reducing efficacy similar to ammonia, the carbon disulfide precursor- and amur-containing solution preferably has a crystallization temperature of at least about 16.7° C. (30° F.), more preferably at least about 19.4° C. (35° F.), even more preferably at least about 22.2° C. (40° F.), and most preferably at least about 25° C. (45° F.) less than the crystallization temperature of the corresponding comparative solution having the same carbon disulfide precursor concentration and compositionally differing from the respective carbon disulfide precursor-containing solution solely in that the comparative solution is devoid of the amur.

Optionally, the carbon disulfide precursor- and amur-containing, aqueous solutions employed in the present invention contain one or more additional ingredients selected from the group consisting of corrosion inhibitors, surfactants, solvents, and mixtures thereof.

The carbon disulfide precursor- and amur-containing, aqueous solutions are prepared by combining the various constituent ingredients in any convenient order. However, since the addition of ammonia to water is an exothermic process, such addition is preferably performed while cooling the mixing tank. On the other hand, since the addition of urea as well as ammonium nitrate to water causes an endotherm, the mixing tank is preferably heated during such additions.

The carbon disulfide precursor- and amur-containing, aqueous solutions are used in oil recovery methods in a manner analogous to the techniques described in U.S. Pat. Nos. 3,724,552 and 5,076,358 with respect to prior art carbon disulfide precursor-containing solutions. Typically, the solutions are used at a rate of about 10 to about 10,000, and preferably about 100 to about 1,000, ppmw of carbon disulfide precursor per barrel of produced crude oil.

In addition, the aqueous solutions are employed to inhibit the formation of paraffins, aspaltenes, maltenes, resins, and elemental sulfur while transporting, holding, or processing oil. For example, while oil is being pumped through an oil pipeline, the aqueous carbon disulfide precursor- and amur-containing solution is injected into the pipeline. Usually, the aqueous solution is introduced into the pipeline very close to the location where the oil enters the pipeline. Alternatively, the solution is commingled with the oil just before the oil is pumped into the pipeline. While the aqueous solution is optionally injected at one or more locations along the pipeline, it is generally only injected where oil is introduced into the pipeline. Regardless of how the solution is introduced into the pipeline or whether the solution is introduced on a continuous or batch basis, the solution is generally introduced at a rate of about 10 to about 10,000, and preferably about 100 to about 1,000, ppmw of carbon disulfide precursor per barrel of produced crude oil introduced into the pipeline.

EXAMPLES

The following examples describe tests conducted to determine the effect of various amurs on the crystallization temperature of carbon disulfide precursor-containing solutions.

Examples 1–10
Determination Of Crystallization Temperature Reduction
The following solutions were prepared:
20 Weight Percent Ammonium Stock Solution Ammonium hydroxide (135.95 g; 29.4 weight percent ammonium) was added to 63.90 g of deionized water.

10 Weight Percent Ammonium Stock Solution

The 20 weight percent ammonium stock solution (100.1 g) was added to 99.9 g of deionized water.

5 Weight Percent Ammonium Stock Solution

The 10 weight percent ammonium stock solution (99.8 g) was added to 99.9 g of deionized water.

20 Weight Percent Urea Stock Solution

Urea (50.0 g) was dissolved in 200 g of deionized water.

10 Weight Percent Urea Stock Solution

The 20 weight percent urea stock solution (100.2 g) was added to 100.2 g of deionized water.

5 Weight Percent Urea Stock Solution

The 10 weight percent urea stock solution (100.0 g) was added to 100.2 g of deionized water.

20 Weight Percent Ammonium Nitrate Stock Solution

Ammonium nitrate (50.0 g) was dissolved in 200 g of deionized water.

10 Weight Percent Ammonium Nitrate Stock Solution

The 20 weight percent ammonium nitrate stock solution (99.7 g) was added to 99.8 g of deionized water.

5 Weight Percent Ammonium Nitrate Stock Solution

The 10 weight percent ammonium nitrate stock solution (100.0 g) was added to 100.0 g of deionized water.

The test solutions listed in the following Table A were prepared by adding one of the foregoing stock solutions or deionized water to a solution containing about 51.5 weight percent sodium tetrathiocarbonate.

TABLE A

Crystallization Temperature Data

| Ex | Stock Solution Type | g | $Na_2CS_4$ Solution, g | g | $Na_2CS_4$, wt % | Amur, wt % | C.T.[1], °C |
|---|---|---|---|---|---|---|---|
| 1 | 20 wt % $NH_3$ | 5.74 | 9.25 | 14.99 | 31.8 | 7.7 | −48 |
| 2 | 10 wt % $NH_3$ | 5.74 | 9.25 | 14.99 | 31.8 | 3.8 | −32 |
| 3 | 5 wt % $NH_3$ | 5.78 | 9.25 | 15.03 | 31.7 | 1.9 | −32 |
| 4 | 20 wt % Urea | 5.75 | 9.24 | 14.99 | 31.7 | 7.7 | −32 |
| 5 | 10 wt % Urea | 5.75 | 9.25 | 15.00 | 31.8 | 3.8 | −24 |
| 6 | 5 wt % Urea | 5.78 | 9.25 | 15.03 | 31.7 | 1.9 | −22 |
| 7 | 20 wt % $NH_4NO_3$ | 5.76 | 9.24 | 15.00 | 31.7 | 7.7 | −32 |
| 8 | 10 wt % $NH_4NO_3$ | 5.75 | 9.25 | 15.00 | 31.8 | 3.8 | −24 |
| 9 | 5 wt % $NH_4NO_3$ | 5.74 | 9.25 | 14.99 | 31.8 | 1.9 | −22 |
| 10 | Deionized $H_2O$ | 5.75 | 9.25 | 15.00 | 31.8 | 0 | −22 |

[1]C.T. denotes crystallization temperature.

Each of the 10 prepared test solutions was mixed in a 16×125 mm culture tube and placed in a tube holder. The tube holder was set over a cooling bath and arranged so that the lower portion of the tube was submerged in the bath. Initially, the bath contained a 1:1 ethylene glycol:water solution. The cooling bath was cooled to about 5° C. After reaching about 5° C., each test solution was seeded with a few crystals of solid sodium tetrathiocarbonate, held at that temperature for at least 24 hours, and inspected for crystallization prior to lowering the bath temperature. The bath temperature was then lowered and, after reaching the lower temperature, each solution that had not already crystallized was reseeded, held at the lower temperature for at least 24 hours, and inspected for crystallization prior to further lowering the bath temperature. After reaching −24° C., the 1:1 ethylene glycol:water solution in the bath was replaced with isopropyl alcohol and dry ice was added to the bath to further depress the bath temperature. The laboratory data obtained from this experiment is set forth below in Table B, with the crystallization temperatures of the test solutions being summarized above in Table A.

TABLE B

Laboratory Data

| Day | Time | Temp. | Comments |
|---|---|---|---|
| 1 | 4:00 pm | 5° C. | Temperature starting point. |
| 3 | 8:15 am | 5° C. | Small amount of solute crystals formed in each of test solutions 7, 8, and 9, with test solution 7 having the most, test solution 8 having not as many, and test solution 9 having the least. |
| 3 | 8:25 am | 0° C. | Temperature starting point. |
| 6 | 8:00 am | −5° C. | Temperature starting point. |
| 7 | 8:45 am | −10° C. | Temperature starting point. No crystals in vials. |
| 8 | 8:45 am | −15° C. | Temperature starting point. |
| 10 | 1:20 pm | −22° C. | Temperature starting point. |
| 14 | 8:00 am | −22° C. | Solute completely crystallized in test solutions 6, 9, and 10. |
| 14 | 10:10 am | −24° C. | Temperature starting point. |
| 16 | 1:38 pm | −24° C. | Solute crystallized in test solutions 5 and 8. |
| 21 | | −32° C. | Solute crystallized in test solutions 2, 3, and 4. |
| 24 | | −48° C. | Solute crystallized in test solution 1 at −48° C.; crystal formed in middle of tube and then floated to top as it grew. Allowed solution to warm to −45.5° C. and crystal began dissolving. |

Since the crystallization temperature of an aqueous solution comprising about 31.8 weight percent aqueous sodium tetrathiocarbonate is about −22° C. (see Example 10) and since the crystallization temperatures of aqueous solutions comprising about 31.8 weight percent aqueous sodium tetrathiocarbonate and varying concentrations of ammonia, urea, or ammonium nitrate is less than about −22° C. (see Examples 1–5 and 7–8), the data set forth in above Tables A and B indicate that ammonia, urea, and ammonium nitrate unexpectedly lower the crystallization temperature of a sodium tetrathiocarbonate solution, with ammonia exhibiting the most striking crystallization temperature depressing efficacy.

Although the present invention has been described in considerable detail with reference to some preferred versions, other versions are possible. Therefore, the spirit and scope of the appended claims should not necessarily be limited to the description of the preferred versions contained herein.

What is claimed is:

1. A method for enhancing the production of oil from a subterranean formation, the method comprising the step of injecting an aqueous solution into a well penetrating the subterranean formation, where the aqueous solution comprises a carbon disulfide precursor and a compound selected from the group consisting of ammonia, ammonium nitrate, ammonium chloride, ammonium sulfate, ammonium acetate, ammonium phosphate, urea, biuret, methyl urea, ethylene urea, ethylene oxide urea, triuret, formamide, dimethylformamide, acetamide, propionamide, butyramide, valeramide, caproamide, benzamide, acetanilide, and mixtures thereof, provided that the ratio of the weight percent of the carbon disulfide precursor to the weight percent of the compound is 2:1 or more.

2. The method of claim 1 where the compound is selected from the group consisting of ammonia, ammonium nitrate, ammonium chloride, ammonium sulfate, ammonium acetate, ammonium phosphate, and mixtures thereof.

3. The method of claim 1 where the compound comprises ammonia.

4. The method of claim 1 where the compound is present in the solution in a concentration of about 0.1 to about 15 weight percent.

5. The method of claim 1 where the carbon disulfide precursor is selected from the group consisting of thiocarbonates, thiocarbamates, xanthates, and mixtures thereof.

6. The method of claim 1 where the carbon disulfide precursor comprises a thiocarbonate.

7. The method of claim 1 where the carbon disulfide precursor comprises a thiocarbonate, and the thiocarbonate is present in the solution in a concentration of at least about 10 weight percent.

8. The method of claim 1 where the ratio of the weight percent of the carbon disulfide precursor to the weight percent of the compound in the solution is about 2.5:1 or more.

9. The method of claim 1 where the ratio of the weight percent of the carbon disulfide precursor to the weight percent of the compound in the solution is about 3:1 or more.

10. The method of claim 1 where the ratio of the weight percent of the carbon disulfide precursor to the weight percent of the compound in the solution is about 3.5:1 or more.

11. The method of claim 1 where the ratio of the weight percent of the carbon disulfide precursor to the weight percent of the compound in the solution is about 4:1 or more.

12. The method of claim 1 where the aqueous solution comprises at least about 10 weight percent of a carbon disulfide precursor.

13. The method of claim 1 where the aqueous solution comprises at least about 15 weight percent of a carbon disulfide precursor.

14. The method of claim 1 where the aqueous solution comprises at least about 20 weight percent of a carbon disulfide precursor.

15. The method of claim 1 where the aqueous solution comprises at least about 25 weight percent of a carbon disulfide precursor.

16. The method of claim 1 where the aqueous solution comprises at least about 30 weight percent of a carbon disulfide precursor.

17. The method of claim 1 where the compound comprises ammonia and the aqueous solution comprises about 2 to about 12 weight percent ammonia.

18. The method of claim 1 where the compound comprises ammonia and the aqueous solution comprises about 3 to about 11 weight percent ammonia.

19. The method of claim 1 where the compound comprises ammonia and the aqueous solution comprises about 4 to about 10 weight percent ammonia.

20. The method of claim 1 where the compound comprises ammonia and the aqueous solution comprises about 5 to about 9 weight percent ammonia.

21. The method of claim 1 where the compound comprises ammonia and the aqueous solution comprises about 6 to about 8 weight percent ammonia.

22. The method of claim 1 where the carbon disulfide precursor comprises a thiocarbonate, the compound comprises ammonia, the aqueous solution comprises at least about 10 weight percent of the thiocarbonate and about 2 to about 12 weight percent ammonia, and the ratio of the weight percent of the thiocarbonate to the weight percent of ammonia is about 2.5:1 or more.

23. The method of claim 1 where the carbon disulfide precursor comprises a thiocarbonate, the compound comprises ammonia, the aqueous solution comprises at least about 15 weight percent of the thiocarbonate and about 3 to about 11 weight percent ammonia, and the ratio of the weight percent of the thiocarbonate to the weight percent of ammonia is about 3:1 or more.

24. The method of claim 1 where the carbon disulfide precursor comprises a thiocarbonate, the compound comprises ammonia, the aqueous solution comprises at least about 20 weight percent of the thiocarbonate and about 4 to about 10 weight percent ammonia, and the ratio of the weight percent of the thiocarbonate to the weight percent of ammonia is about 3.5:1 or more.

25. The method of claim 1 where the carbon disulfide precursor comprises a thiocarbonate, the compound comprises ammonia, the aqueous solution comprises at least about 25 weight percent of the thiocarbonate and about 5 to about 9 weight percent ammonia, and the ratio of the weight percent of the thiocarbonate to the weight percent of ammonia is about 4:1 or more.

26. The method of claim 1 where the carbon disulfide precursor comprises a thiocarbonate having the formula $(M^{+a})_b(CS_d)^{-2}$, with:

M being selected from the group consisting of inorganic and organic cations, the inorganic cations being selected from the group consisting of alkali metal cations, alkaline earth metal cations, and transition metal cations and the organic cations having the formula $(X_1^{+f1})_{g1}(X_2^{+f2})_{g2}(X_3^{+f3})_{g3}(X_4^{+f4})_{g4}Q^{+h}$, with $X_1$, $X_2$, $X_3$, and $X_4$ being independently selected from the group consisting of hydrogen, methyl, ethyl, n-propyl, isopropyl, n-butyl, sec-butyl, t-butyl, isobutyl, hexyl, octyl, phenyl, and benzyl; f1 being the valence of $X_1$; f2 being the valence of $X_2$; f3 being the valence of $X_3$; f4 being the valence of $X_4$; Q being a nonmetal; each of g1, g2, g3, and g4 being 0 or 1; and h being the valence of Q, provided that at least one of $X_1$, $X_2$, $X_3$, or $X_4$ is an organic group, and f1+f2+f3+f4 is a positive integer less than h;

a being the valence of M;

b being a positive integer;

d being at least 3; and a·b equaling 2.

27. The method of claim 26 where the inorganic cations are selected from the group consisting of sodium, potassium, magnesium, calcium, zinc, iron, manganese, copper, and molybdenum; Q is selected from the group consisting of primary, secondary, tertiary, and quaternary ammonium, phosphonium, arsonium, and stibonium cations; and d is 3–8.

28. The method of claim 27 where Q is quaternary ammonium.

29. The method of claims 1 where the carbon disulfide precursor comprises a thiocarbonate and the aqueous solution further comprises a stabilizing agent selected from the group consisting of bases, sulfur and sulfur-containing compounds, the sulfur-containing compounds having a formula selected from the group consisting of $H_2S_i$, $HR_1S_i$, $R_1R_2S_i$, $MHS_i$, $(M^{+a})_bS_i$, and $MR_1S_i$, with:

- M being selected from the group consisting of inorganic and organic cations, the inorganic cations being selected from the group consisting of alkali metal cations, alkaline earth metal cations, and transition metal cations and the organic cations having the formula $(X_1^{+f1})_{g1}(X_2^{+f2})_{g2}(X_3^{+f3})_{g3}(X_4^{+f4})_{g4}Q^{+h}$, with $X_1$, $X_2$, $X_3$, and $X_4$ being independently selected from the group consisting of hydrogen, methyl, ethyl, n-propyl, isopropyl, n-butyl, sec-butyl, t-butyl, isobutyl, hexyl, octyl, phenyl, and benzyl; f1 being the valence of $X_1$; f2 being the valence of $X_2$; f3 being the valence of $X_3$; f4 being the valence of $X_4$; Q being a nonmetal; each of g1, g2, g3, and g4 being 0 or 1; and h being the valence of Q, provided that at least one of $X_1$, $X_2$, $X_3$, or $X_4$ is an organic group, and f1+f2+f3+f4 is a positive integer less than h;
- $R_1$ and $R_2$ being independently selected from the group consisting of hydrogen, methyl, ethyl, n-propyl, isopropyl, n-butyl, sec-butyl, t-butyl, isobutyl, hexyl, octyl, phenyl, and benzyl;
- a being the valence of M;
- b being a positive integer;
- a·b equaling 2; and
- i being at least 1.

30. The method of claim 29 where the stabilizing agent comprises a base selected from the group consisting of alkali metal hydroxides, alkaline earth metal hydroxides, and ammonium hydroxide.

31. The method of claim 29 where the stabilizing agent comprises a base selected from the group consisting of sodium hydroxide, potassium hydroxide, alkaline earth metal hydroxides, and ammonium hydroxide.

32. The method of claim 29 where the stabilizing agent comprises a sulfur-containing compound selected from the group consisting of ammonium sulfide, ammonium polysulfides, alkali sulfides, alkali polysulfides, alkaline earth metal sulfides, alkaline earth metal polysulfides, and mixtures thereof.

33. An oil production system comprising:
(a) an oil-bearing subterranean formation;
(b) a well penetrating at least a portion of the oil-bearing subterranean formation; and
(c) an aqueous solution comprising a carbon disulfide precursor and a compound selected from the group consisting of ammonia, ammonium nitrate, ammonium chloride, ammonium sulfate, ammonium acetate, ammonium phosphate, urea, biuret, methyl urea, ethylene urea, ethylene oxide urea, triuret, formamide, dimethylformamide, acetamide, propionamide, butyramide, valeramide, caproamide, benzamide, acetanilide, and mixtures thereof present in at least a portion of the well, where the ratio of the weight percent of the carbon disulfide precursor to the weight percent of the compound in the solution is 2:1 or more.

34. A method for processing oil comprising the steps of:
(a) processing oil by means of a device; and
(b) injecting into the device an aqueous solution comprising (i) a carbon disulfide precursor and (ii) a compound selected from the group consisting of ammonia, ammonium nitrate, ammonium chloride, ammonium sulfate, ammonium acetate, ammonium phosphate, urea, biuret, methyl urea, ethylene urea, ethylene oxide urea, triuret, formamide, dimethylformamide, acetamide, propionamide, butyramide, valeramide, caproamide, benzamide, acetanilide, and mixtures thereof, where the ratio of the weight percent of the carbon disulfide precursor to the weight percent of the compound in the solution is 2:1 or more.

35. An oil processing system comprising a device for processing oil and present in the device are oil and an aqueous solution comprising (i) a carbon disulfide precursor and (ii) a compound selected from the group consisting of ammonia, ammonium nitrate, ammonium chloride, ammonium sulfate, ammonium acetate, ammonium phosphate, urea, biuret, methyl urea, ethylene urea, ethylene oxide urea, triuret, formamide, dimethylformamide, acetamide, propionamide, butyramide, valeramide, caproamide, benzamide, acetanilide, and mixtures thereof, where the ratio of the weight percent of the carbon disulfide precursor to the weight percent of the compound in the solution is 2:1 or more.

* * * * *